July 26, 1938.  J. W. WHARMBY  2,124,723
CUP PASTRY BAKING MACHINE
Filed Sept. 16, 1937  3 Sheets-Sheet 1

Fig. 5-A

JAMES W. WHARMBY
INVENTOR-

BY Henry Savage
ATTORNEY-

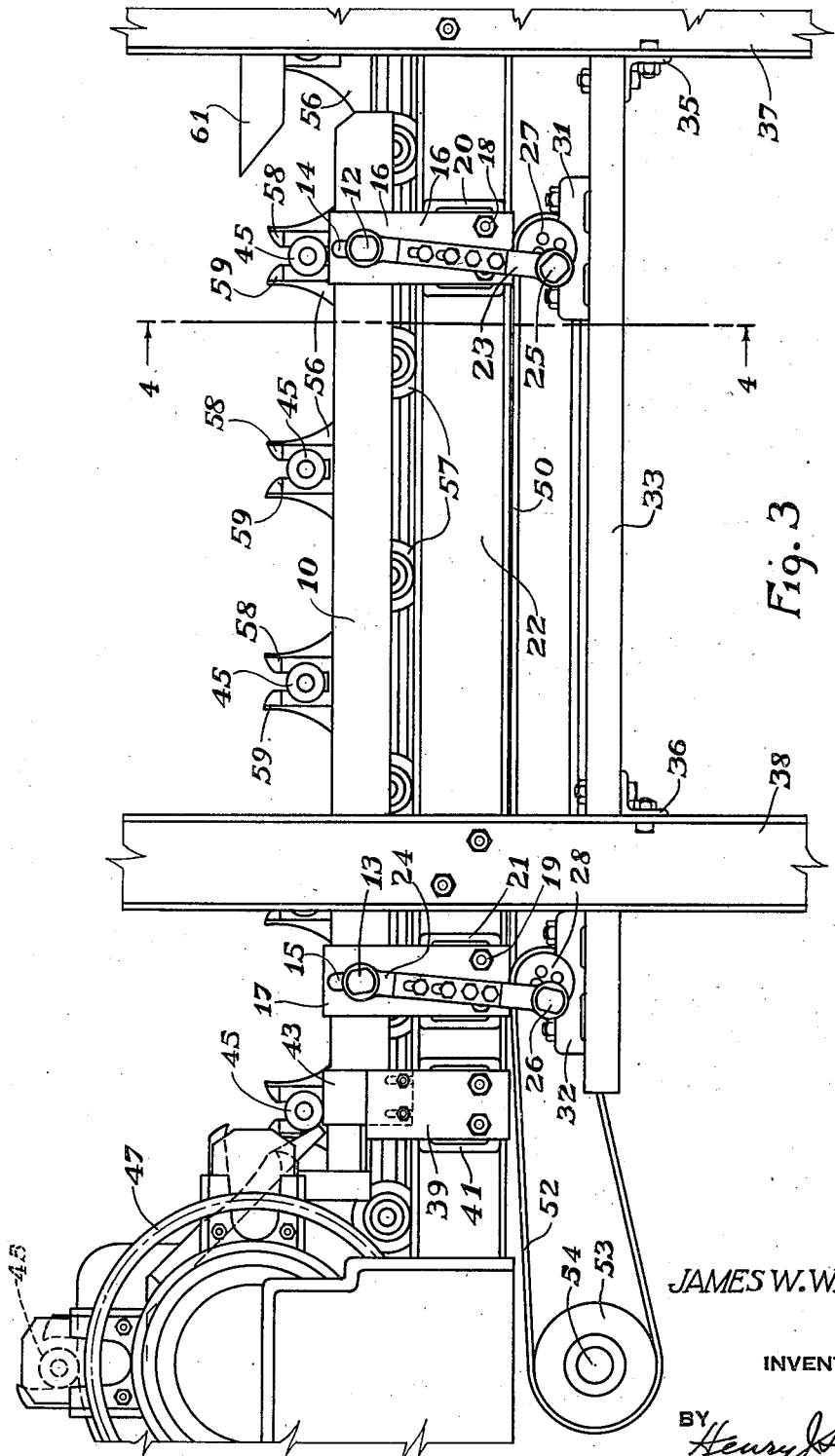

July 26, 1938.　　　　J. W. WHARMBY　　　　2,124,723
CUP PASTRY BAKING MACHINE
Filed Sept. 16, 1937　　　3 Sheets-Sheet 3
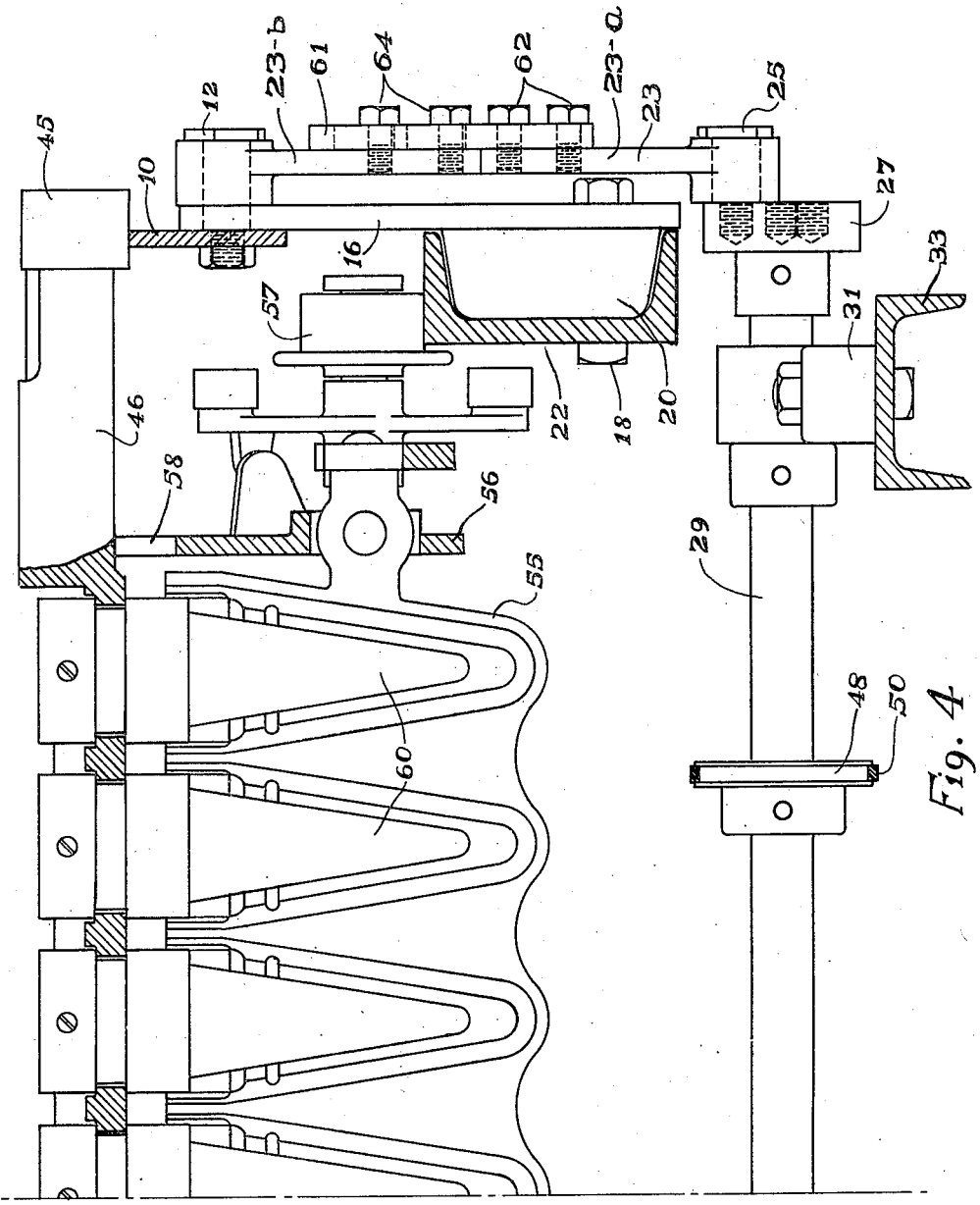
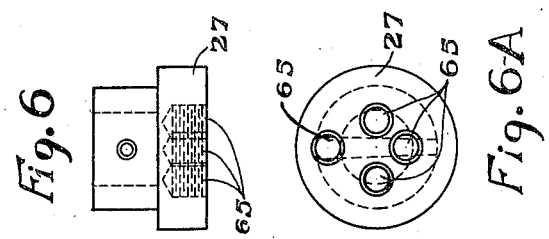
JAMES W. WHARMBY
INVENTOR-
BY Henry Savage
ATTORNEY- Patented July 26, 1938

2,124,723

UNITED STATES PATENT OFFICE 2,124,723

CUP PASTRY BAKING MACHINE

James W. Wharmby, Dayton, Ohio, assignor to National Biscuit Company, New York, N. Y., a corporation of New Jersey Application September 16, 1937, Serial No. 164,141

16 Claims. (Cl. 107—58)

My invention pertains to improvements in cup pastry baking machines and particularly to automatic machines having a number of mold units for baking the pastry cups, wherein each unit consists of an outer mold member having a number of cavities for shaping the outer surface of the cups and the same number of cores or inner mold members for shaping the inner surface of the cups. Each outer mold member may be a single piece or solid mold, or a two part or divided mold, and the cavities usually are provided with some form of ornamental figures to impart a decorative outer surface to the cups. The inner mold members usually are solid, single piece cores that form the smooth interiors of the cups.

The mold units are mounted on a movable carrier, which may travel in a vertical or horizontal plane, and be driven either continuously or with a step-by-step movement. The carrier travels a path that takes the mold units successively through a charging station where the molds receive the proper amounts of dough or batter to make the cups, a heating zone or area where heat is applied to the molds to bake the cups, and a discharge station or zone where the mold members are manipulated to discharge the baked cups from the machine.

When the batter is supplied to a mold unit, the cores are lifted from the outer molds and proper amounts or charges of batter supplied to each cavity. The cores are then returned to the cavities and the baking or cooking starts. Both the cores and outer mold members are hot which results in the formation of a large amount of steam and other gases from the batter during the initial part of the baking operation. These gases must be permitted to escape in order to avoid building up a high pressure in the molds and also to permit or cause the batter to rise or swell and completely fill the annular spaces between the cores and walls of the mold cavities so as to form the cups. This venting of the molds, as it is called, usually has been accomplished by raising and lowering the cores a slight distance in the mold cavities, with a more or less pump like action, during the early part of the baking operation. This has been effective in riding the molds of gases and causing the batter to fill the mold cavities but the means for doing it has produced excessive wear and friction, and also causes many of the cups to be baked with walls of unequal thickness by forcing the cores, or their lower ends, to one side in the mold cavities instead of keeping them central or co-axial with the cavities. The cores generally have been raised by causing them to ride up inclined cams or "teeter lugs" as is shown, for example, in the patent to Balton, 1,772,450 and then drop back into the molds by gravity, or be raised by steam pressure and then be forced back into the molds by inclined cams as shown, for example, in the patent to McLaren, 1,551,998. The cores usually are raised and lowered from four to nine times and, toward the end of this operation, the batter has lost its fluidity and become quite dense. Because of the side pressure of the inclined lugs, the lower ends of the cores tend to swing to one side in the cavities and when the steam has escaped, the batter or dough has become so heavy that the cores do not seat centrally in the molds but their lower ends stay at one side, thus making the walls of the cups of unequal thickness. Often the cores go clear through the sides of the cups and in other cases one wall is so thin that it crumbles and the opposite wall is so thick that it bakes imperfectly. This results in a considerable loss of materials and greatly reduces the output and efficiency of the machine.

Among the objects of the present invention, therefore, are to provide means to vent the molds of cup pastry machines, to "work" the batter to fill the molds and to keep the cores central or co-axial in the molds.

The above and other objects are accomplished by the embodiment of my invention illustrated in the accompanying drawings, wherein I have illustrated it as adapted to a cone baking machine of the endless chain type such as that shown in the patent to McLaren, 1,551,998, but it is of course applicable to all types of automatic cup pastry baking machines.

Fig. 3 is an enlarged side elevation of part of a machine embodying my invention.

Fig. 4 is a sectional view taken substantially on the line 4—4 of Fig. 3, but with the upper part of the section taken midway of the mold unit.

Figure 1:
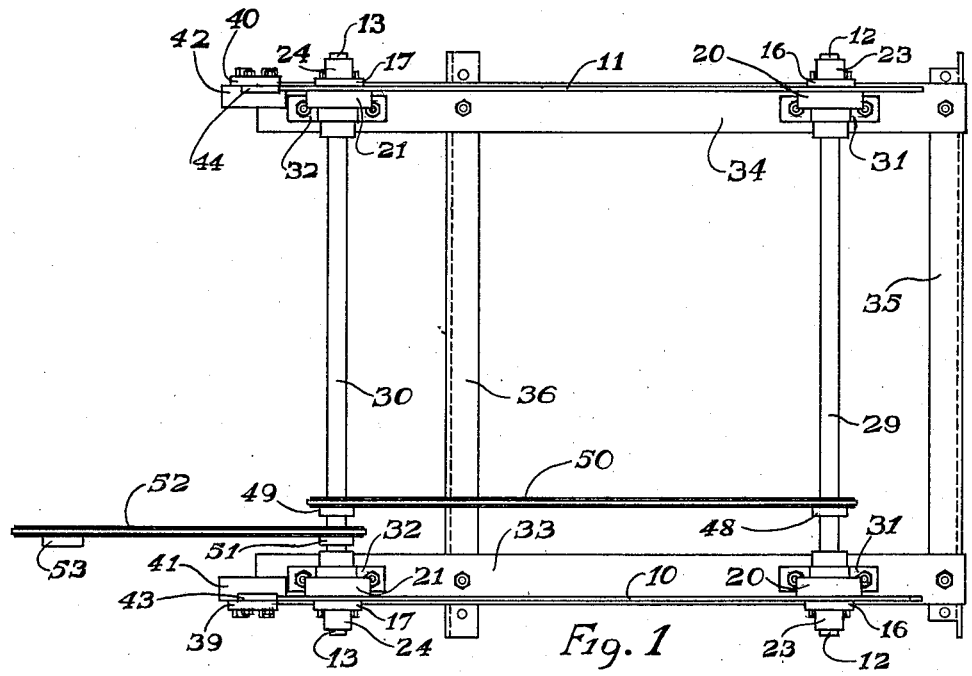
Figs. 1 and 2 are a plan and side elevation, respectively, of the invention embodied in an attachment or unit adapted to be substituted for the camel backs and interrupted squeeze track in a machine of the type shown in the McLaren patent, 1,551,998.
Figure 2:
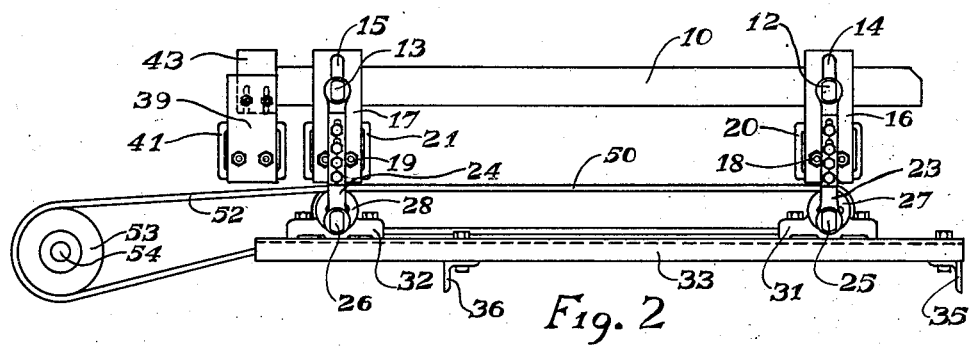
Figure 5:
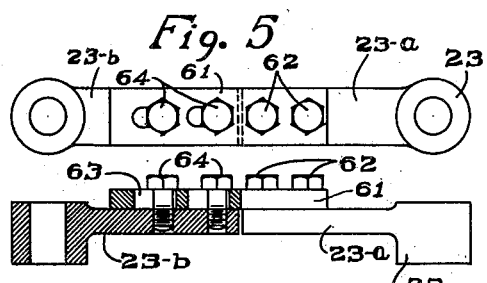

Figs. 5 and 5—A are a plan view and a side elevation, partly in section, of an adjustable pitman or link that connects each crank pin with one of the wrist pins on the core lifting tracks.

Figs. 6 and 6—A are plan view and side elevation of one form of crank disk having different throws.

In its simplest form, my invention comprises a horizontal rail or track on each side of the machine which is moved up and down in proper timed relation to engage the rollers on the opposite ends of one or more of the core carrying bars and teeter the cores vertically in the molds during the steam escape period. A single piece rail or track may be used on each side of the machine long enough to lift simultaneously all of the cores at one time in all of the molds that are within the steam-venting area, or it may be in two or more sections.

Referring to Figs. 1 and 2, 10 and 11 indicate the core lifting tracks or rails each carrying a pair of wrist pins 12, 13 extending through slots 14, 15, in vertical guide plates 16, 17 which are attached by bolts 18, 19 and filler blocks 20, 21 to the channel frame members 22 (Figs. 3 and 4) of the cone machine.

Links 23, 24 connect the wrist pins 12, 13 to the crank pins 25, 26 secured in the crank disks 27, 28 which are fixed to the opposite ends of two parallel shafts 29, 30. These shafts are journalled in bearings 31, 32, secured to a pair of frame members 33, 34, preferably made from light channels. These channels are secured to a pair of angle irons 35, 36 of sufficient length to extend across the cone baking machine and spaced apart such distance that their opposite ends can be bolted to opposite pairs of vertical legs or posts 37, 38 of the frame of the machine. The channels 33, 34 and angles 35, 36 provide a sub-frame which together with the parts associated therewith (Figs. 1 and 2) form a unit that can be inserted in existing machines of the McLaren type, but of course, when the invention is adapted to other machines, the sub-frame will be modified to fit the particular machine, and in some cases, particularly in new machines of any type, the operating parts may be secured directly to the machine frame, or the machine designed to have them incorporated.

An adjustable catch plate 39, 40, adjacent the entrant end of each of the rails 10, 11, is secured by bolts and filler blocks 41, 42 to the side frame members 22 of the machine. The upper ends 43, 44 of these plates are adjustable as to height to catch the rollers 45 on the opposite ends of the core bars 46 when the cores are returned to the molds by the carry-over mechanism indicated generally at 47 in Fig. 3 but which per se forms no part of the present invention. While I have found these catch plates to be advantageous, they are not always necessary, and when not used, the rails 10, 11 will be extended toward the carry-over so as to receive the core bars.

The shafts 29, 30 have sprockets 48, 49 fixed thereto and connected to be driven in unison by the chain 50. The shaft 30 has a second sprocket 51 driven by a chain 52 from a sprocket 53 mounted on a shaft 54 that forms a part of the operating mechanism of the cone machine. In this case, the shaft 54 is the pump operating shaft of the machine because most conveniently located, but the drive may be taken from any part of the machine and the sprockets 51, 53 selected of the correct ratio to drive the shafts 29, 30, and lift the tracks 10, 11 in proper timed relation to the travel of the core bars 46 or mold units.

The mold units, which per se form no part of the present invention but are incorporated only to illustrate an adaptation thereof, and a complete operative combination, are more fully shown in the patent to McLaren 1,551,998, supra. They consist of separable mold sections 55 carried by links 56 which are connected to form an endless chain and run on rollers 57 on tracks provided by the frame members of the machine. These links have upwardly extending ears 58, 59 that form vertical guides for the core bars 46 so that the core bars and cores 60 can be raised and lowered to vent the molds and work the batter during the initial part of the baking period.

The ice cream cones and other pastry cups are of many different diameters, lengths and thicknesses, and the doughs used are of many different formulae so that amount of the venting and distances that the cores are raised may vary within considerable limits. Variations in the timing and periodicity of the venting may be secured by varying the length of the rails 10, 11 and the ratio of the sprockets 51, 53, but variations in the lift of the cores is best attained by varying the throw of the cranks 27, 28 and by making the pitmans 23, 24 adjustable.

In Figs. 5 and 5—A, I have shown one way of adjusting the length of the pitman 23. It is made in two parts 23a and 23b to one of which an adjusting plate 61 is secured by bolts 62, the other end of the plate having elongated holes 63 through which adjusting screws 64 pass for clamping it to the other end of the pitman in any desired position of adjustment. The crank pins 25, 26 also have adjustable throws which may be secured (as shown in Figs. 6 and 6—A) by providing each crank disk with a number of tapped holes 65 at different distances from the center into which the crank pins 25, 26 may be screwed. By these means the timing and amount of lift of the cores may be varied within any practicable limits.

Usually the catch plates 43, 44 are adjusted so that their top edges catch the rollers 45 just at the height when the cores 60 have dropped fully down into the molds and the pitmans 23, 24 are adjusted and the crank throws selected so that the cranks are horizontal when the rails 10 and 11 are even with the tops to the catch plates. When thus adjusted, the rails will have half their travel above this position, when they are lifting the cores, and half of their travel below this position, when the cores will be resting by gravity in the molds. The cores are raised to permit the escape of gases during one half of their travel along the rails 10, 11, and are at rest for one half of this period. However, by proper selection of the crank throw and adjustment of the pitman length, the intervals of lift and rest of the cores may be varied within wide limits to meet any baking conditions.

The length of the rails 10, 11, whether made in single sections, or multiple sections, is determined by the baking characteristics of the machine, the length being long enough to properly vent the molds. In the machine illustrated, the rails are long enough to lift four core bars one time and five the next and since the shafts 29, 30, are driven at twice the speed of the pump shaft 54, each core bar will be lifted nine times, which has been found to give good results in this type of machine.

Because the rails 10, 11 move only up and down and lift the core bars by their contact with the rollers 45, the cores are always raised and lowered vertically in the molds and they have no tendency to swing to one side, as they do when being raised by sliding up inclined "teeter" cams. The cores always remain co-axial with the cavities in the mold sections with the result that the pastry cups have walls of uniform thickness.

The shafts 29, 30 are timed so that as a core bar is delivered from the carry-over 47 to the catch plates 43, 44, the rails are moving up and are just below the top of plate 43. They reach the top of the plate as the rollers 45 leave and thus lift the cores just after they have first dropped into the molds. As the rollers 45 leave the right hand end of the rails 10, 11, (Fig. 3) they pass under the squeeze track 61 which is fixed on the frame of the machine and forces the cores fully down into the molds where they are held until the baking is completed.

Having thus described one form that my invention may take, I claim all modifications and equivalents thereof that may come within the spirit thereof or the scope of the following claims:

1. In a cup pastry baking machine of the class having a plurality of traveling molds and cores therefor wherein charges of batter are supplied to the molds, the combination with the molds and cores of reciprocating means to raise and lower the cores in the molds during the initial part of the baking period.

2. In a cup pastry baking machine of the class having a plurality of traveling molds and cores with means for supplying batter to the molds and means for heating the molds and cores to bake the pastry cups, the combination of a core bar for each mold to which the cores are attached, a movable track over which the core bars pass during the initial part of the baking, and means for reciprocating the track parallel with the axes of the cores into and out of engagement with the core bars to raise and lower the cores in the molds.

3. In a cup pastry baking machine of the class having a plurality of traveling molds and cores with means for supplying batter to the molds and means for heating the molds and cores to bake the pastry cups, the combination of a core bar for each mold to which the cores are attached, a roller on each end of the core bar, a rail over which each of said rollers passes during the initial part of the baking, and means for moving said rails into and out of engagement with said rollers to raise and lower the cores in the molds.

4. In a cup pastry baking machine of the class having a plurality of traveling molds and cores with means for supplying batter to the molds and means for heating the molds and cores to bake the pastry cups, the combination of a core bar for each mold to which the cores are attached, a roller on each end of the core bar, a horizontal rail over which each of said rollers passes during the initial part of the baking, and means for reciprocating said rails into and out of engagement with said rollers to raise and lower the cores in the molds.

5. In a cup pastry baking machine of the class having a plurality of traveling molds and cores with means for supplying batter to the molds and means for heating the molds and cores to bake the pastry cups, the combination of a core bar for each mold to which the cores are attached, a roller on each end of the core bar, a horizontal rail over which each of said rollers passes during the initial part of the baking, a transverse shaft journalled on the frame of the machine and having a pair of cranks, means for rotating the shaft, links connecting the cranks to the respective rails, vertical guides for said rails, whereby rotation of said shaft will raise and lower said rails and the cores in the molds during the initial part of the baking period.

6. In a cup pastry baking machine of the class having a plurality of traveling molds and cores with means for supplying batter to the molds and means for heating the molds and cores to bake the pastry cups, the combination of a core bar for each mold to which the cores are attached, a roller on each end of the core bar, a horizontal rail over which each of said rollers passes during the initial part of the baking, two transverse shafts journalled on the machine frame, one below each end of said rails, a pair of cranks on each shaft, means for rotating said shafts in unison, a vertical guide for each rail, links connecting the cranks on each shaft with the adjacent ends of each rail, whereby rotation of the shafts will reciprocate the rails vertically and raise and lower the cores in the molds.

7. In a cup pastry baking machine of the class having a plurality of traveling separable molds and cores wherein a carry-over mechanism lifts the cores out of the molds and carries them over a batter charging means, the combination of a core bar carrying the cores for each mold, catch plates to receive the ends of the core bars as the cores are delivered to the molds from the carry-over mechanism, a pair of rails to receive the ends of the core bars as they leave the catch plates, and means for moving the rails up and down whereby the cores are raised and lowered in the molds.

8. In a cup pastry baking machine of the class having a plurality of traveling separable molds and cores wherein a carry-over mechanism lifts the cores out of the molds and carries them over a batter charging means, the combination of a core bar carrying the cores for each mold, catch plates to receive the ends of the core bars as the cores are delivered to the molds from the carry-over mechanism, a pair of rails to receive the ends of the core bars as they leave the catch plates, said rails being of sufficient length to receive a plurality of consecutive core bars, said bars traveling along said rails from the catch plates to the opposite ends, means for reciprocating the rails parallel to the axes of the cores whereby the cores will be raised and lowered in the molds.

9. In a cup pastry baking machine of the class having a plurality of traveling separable molds and cores wherein a carry-over mechanism lifts the cores out of the molds and carries them over a batter charging means, the combination of a core bar carrying the cores for each mold, catch plates to receive the ends of the core bars as the cores are delivered to the molds from the carry-over mechanism, a pair of rails to receive the ends of the core bars as they leave the catch plates, said rails being of sufficient length to receive a plurality of consecutive core bars, said bars traveling along said rails from the catch plates to the opposite ends, and means for reciprocating the rails both above and below the level of the catch plates.

10. In a cup pastry baking machine of the class having a plurality of traveling separable molds and cores wherein a carry-over mechanism lifts the cores out of the molds and carries them over a batter charging means, the combination of a core bar carrying the cores for each mold, catch plates to receive the ends of the core bars as the cores are delivered to the molds from the carry-over mechanism, a pair of rails to receive the ends of the core bars as they leave the catch plates, said rails being of sufficient length to receive a plurality of consecutive core bars, said bars traveling along said rails from the catch plates to the opposite ends, means for reciprocating the rails whereby the cores will be raised and lowered in the molds, and means for holding the cores in the molds after they leave the said rails.

11. In a cup pastry baking machine of the class having a plurality of mold units comprising molds and cores wherein the cores are loose in the molds during the initial part of the baking operation, the combination of a connected series of molds, a core bar having cores for each mold, a pair of rails over which said core bars travel during said initial part of the baking operation, means for reciprocating said rails parallel to the axes of the cores, a part of the travel of said rails being above the normal seated position of the core bars and a part below, whereby the cores will be raised and lowered alternately in the molds during their travel over said rails.

12. In a venting and centering device for cup pastry baking machines, the combination of two parallel shafts, cranks on the opposite ends of each shaft, means for rotating said shafts and cranks in synchronism, a guide above each crank, a pair of rails extending transversely above the ends of said shafts and adjacent said guides, pins secured to said rails and operating in said guides, and links connecting said cranks and pins, whereby rotation of said cranks will reciprocate said rails in unison.

13. In a venting and centering device for cup pastry baking machines, the combination of two parallel shafts, cranks on the opposite ends of each shaft, means for rotating said shafts and cranks in synchronism, a guide above each crank, a pair of rails extending transversely above the ends of said shafts and adjacent said guides, pins secured to said rails and operating in said guides, and links connecting said cranks and pins, whereby rotation of said cranks will reciprocate said rails in unison, and a catch plate mounted adjacent one end of each rail.

14. In a venting and centering device for cup pastry baking machines, the combination of two parallel frame members secured together in spaced apart relation, a pair of parallel shafts mounted in bearings on the frame members, said shafts having a crank at each end, all of said cranks being in phase, means for rotating said shafts in unison, a vertical guide adjacent each crank, a pin slidable in each guide, links connecting the pins to the respective cranks, a pair of rails parallel to said frame members and each connected to two of said pins.

15. In a venting and centering device for cup pastry baking machines, the combination of two parallel shafts, cranks on the opposite ends of each shaft, means for rotating said shafts and cranks in synchronism, a pair of rails extending transversely above the ends of said shafts, links connecting said cranks and rails, whereby rotation of said cranks will reciprocate said rails, and means for varying the throws of said cranks whereby the opposite ends of said rails may be given the same or different strokes, and the rails as a whole may be given different strokes.

16. In a venting and centering device for cup pastry baking machines, the combination of two parallel shafts, cranks on the opposite ends of each shaft, means for rotating said shafts and cranks in synchronism, a pair of rails extending transversely above the ends of said shafts, links connecting said cranks and rails, whereby rotation of said cranks will reciprocate said rails, means for varying the throws of said cranks whereby the opposite ends of said rails may be given the same or different strokes, and the rails as a whole may be given different strokes, and means for adjusting the lengths of said links.

JAMES W. WHARMBY.